(12) United States Patent
Nagar et al.

(10) Patent No.: US 11,868,319 B2
(45) Date of Patent: Jan. 9, 2024

(54) FILE STORAGE SYSTEM BASED ON ATTRIBUTES OF FILE COMPONENTS

(71) Applicant: International Business Machines Corporation, Armonk, NY (US)

(72) Inventors: Raghuveer Prasad Nagar, Kota (IN); Harshit Sharma, Hathras (IN); Satisha C Honnavalli, Bangalore (IN); Parvathy Rajeev, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/643,192

(22) Filed: Dec. 8, 2021

(65) Prior Publication Data

US 2023/0177019 A1    Jun. 8, 2023

(51) Int. Cl.
G06F 7/00 (2006.01)
G06F 16/18 (2019.01)

(52) U.S. Cl.
CPC .................................. G06F 16/18 (2019.01)

(58) Field of Classification Search
CPC ............... G06F 16/18; G06F 16/24524; G06F 16/3349; G06F 16/9017; G06F 17/22
See application file for complete search history.

(56) References Cited

U.S. PATENT DOCUMENTS

| | | | |
|---|---|---|---|
| 7,487,440 B2 * | 2/2009 | Gergic | G10L 15/22 704/235 |
| 8,250,040 B2 | 8/2012 | Murphy | |
| 8,370,312 B1 | 2/2013 | Sawhney | |
| 9,558,098 B1 * | 1/2017 | Alshayeb | G06F 11/3604 |
| 9,785,767 B2 * | 10/2017 | Eksten | G06F 21/51 |
| 10,083,234 B2 | 9/2018 | Maharajh | |
| 10,380,074 B1 * | 8/2019 | Gu | G06F 16/1752 |
| 10,684,995 B2 | 6/2020 | Chan | |
| 11,243,749 B1 * | 2/2022 | Krishnamoorthy | G06F 8/75 |
| 11,524,151 B2 * | 12/2022 | Lanigan | A61M 5/14244 |
| 11,526,543 B2 * | 12/2022 | Keen | G06F 16/3344 |
| 11,528,285 B2 * | 12/2022 | Achleitner | H04L 43/026 |
| 2002/0095348 A1 * | 7/2002 | Hiroshige | G06Q 30/0619 705/305 |
| 2002/0198719 A1 * | 12/2002 | Gergic | G06F 9/451 704/E15.04 |
| 2003/0200532 A1 * | 10/2003 | Gensel | G06F 8/71 717/115 |
| 2007/0083405 A1 * | 4/2007 | Britt | G06Q 30/02 705/70 |
| 2011/0083114 A1 * | 4/2011 | Chetput | G06F 30/33 716/106 |

(Continued)

OTHER PUBLICATIONS

"Remo Duplicate Photos Remover", Remo Software, © Remo Software Private Limited, <https://apps.apple.com/us/app/remo-duplicate-photos-remover/id1066797785>, downloaded Sep. 9, 2021, 3 pages.

(Continued)

*Primary Examiner* — Mohammed R Uddin
(74) *Attorney, Agent, or Firm* — Brian M. Restauro; Stephen Yoder

(57) ABSTRACT

Providing an Artificial Intelligence (AI) and Internet of Things (IoT) based system and method that predicts the chronological requirements for various components of the file-being-stored, and then takes an appropriate storage action on each component based on the predicted chronological requirements.

18 Claims, 5 Drawing Sheets

(56) References Cited

U.S. PATENT DOCUMENTS

| | | | | |
|---|---|---|---|---|
| 2012/0290926 | A1* | 11/2012 | Kapadia | G06F 40/166 715/255 |
| 2012/0331440 | A1* | 12/2012 | Meermeera | G06F 8/36 717/101 |
| 2013/0047137 | A1* | 2/2013 | Bak | G06F 8/71 717/121 |
| 2014/0040862 | A1* | 2/2014 | Webster | G06F 8/61 717/121 |
| 2016/0371249 | A1* | 12/2016 | Chilakamarri | G06F 16/93 |
| 2018/0157825 | A1* | 6/2018 | Eksten | H04L 9/3247 |
| 2019/0265957 | A1* | 8/2019 | Risbood | G06F 9/5072 |
| 2020/0184272 | A1* | 6/2020 | Zhang | G06N 20/00 |
| 2020/0341801 | A1* | 10/2020 | Aziz | H04L 63/10 |
| 2021/0117714 | A1* | 4/2021 | Yang | G06F 40/166 |
| 2021/0294581 | A1* | 9/2021 | Iida | G06F 40/30 |
| 2022/0382463 | A1* | 12/2022 | Kondo | G06F 16/18 |

OTHER PUBLICATIONS

"System for specifying lifecycle while creating a file", IP.Com, IPCOM000174207D, Sep. 1, 2008, 6 pages.

Disclosed Anonymously, "Rule based containers for enhanced file management, archive and deletion", ip.com, IPCOM000193824D, Mar. 10, 2010, 4 pages.

Disclosed Anonymously, "System and method for identifying obsolete files on a file system", An IP.com Prior Art Database Technical Disclosure, IPCOM000210415D, <https://priorart.ip.com/IPCOM/000210415>, Sep. 2, 2011, 4 pages.

Disclosed Anonymously, "Technique to find files to archive or delete based on users internet activities", IP.Com, IPCOM000238873D, Sep. 23, 2014, 3 pages.

Mell et al., "The NIST Definition of Cloud Computing", National Institute of Standards and Technology, Special Publication 800-145, Sep. 2011, 7 pages.

Taft, Darryl K., "IBM Introduces Cognitive Storage", eWeek, <https://www.eweek.com/innovation/ibm-introduces-cognitive-storage/>, Apr. 4, 2016, 5 pages.

Xie et al., "Towards Use and Reuse Driven Big Data Management", JCDL '15: Proceedings of the 15th ACM/IEEE-CS Joint Conference on Digital Libraries, Jun. 2015, pp. 65-74, <https://dl.acm.org/doi/10.1145/2756406.2756924>.

* cited by examiner

FILE STORAGE SYSTEM BASED ON ATTRIBUTES OF FILE COMPONENTS

BACKGROUND

The present invention relates generally to the field of file systems, and more specifically towards optimizing the use of file systems in a large scale enterprise environment.

The Wikipedia entry for "File system" (as of Nov. 4, 2021) states as follows: "In computing, file system . . . is a method and data structure that the operating system uses to control how data is stored and retrieved. Without a file system, data placed in a storage medium would be one large body of data with no way to tell where one piece of data stops and the next begins. By separating the data into pieces and giving each piece a name, the data is easily isolated and identified. Taking its name from the way paper-based data management system is named, each group of data is called a 'file.' The structure and logic rules used to manage the groups of data and their names is called a 'file system.'"

SUMMARY

According to an aspect of the present invention, there is a method, computer program product and/or computer system that performs the following operations (not necessarily in the following order): (i) receiving a plurality of files from a file system, with the plurality of files including a set of file components that are used to define each given file of the plurality of files; (ii) determining, by an artificial intelligence (AI) module, that a first sub-set of files of the plurality of files includes a set of components that are potentially reusable; (iii) determining, by a machine learning module, that the set of components are reusable based, at least in part, upon the set of components having a reusability score above a component reusability threshold; and (iv) responsive to the determination that the set of components are reusable, taking a storage action on the first sub-set of files.

DETAILED DESCRIPTION

Figure 1:
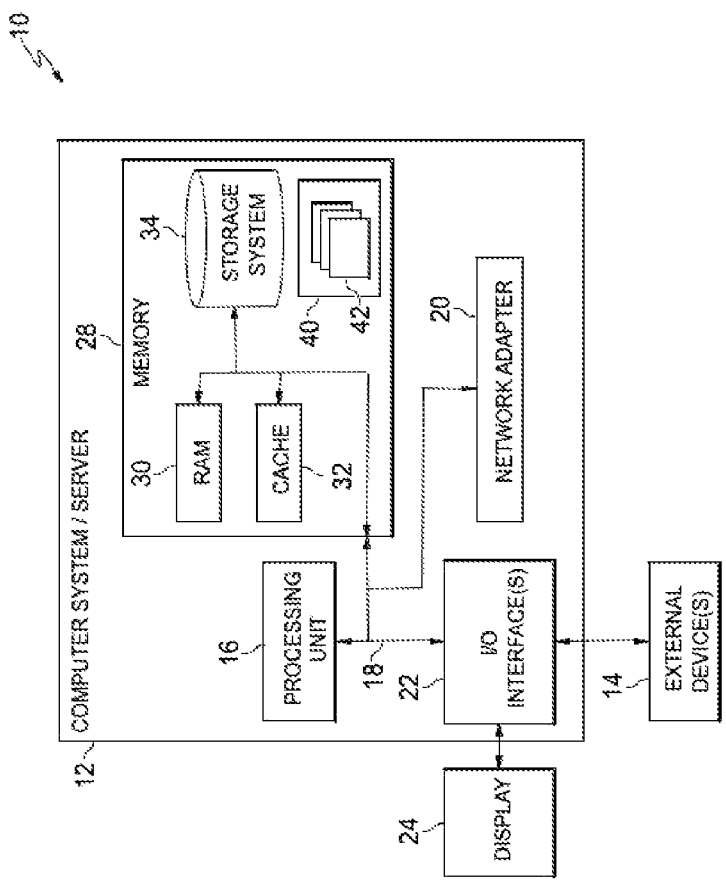
FIG. 1 depicts a cloud computing node used in a first embodiment of a system according to the present invention.

Some embodiments of the present invention are directed to providing an Artificial Intelligence (AI) and Internet of Things (IoT) based system and method that predicts the chronological requirements for various components of the file-being-stored, and then takes an appropriate storage action on each component based on the predicted chronological requirements.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
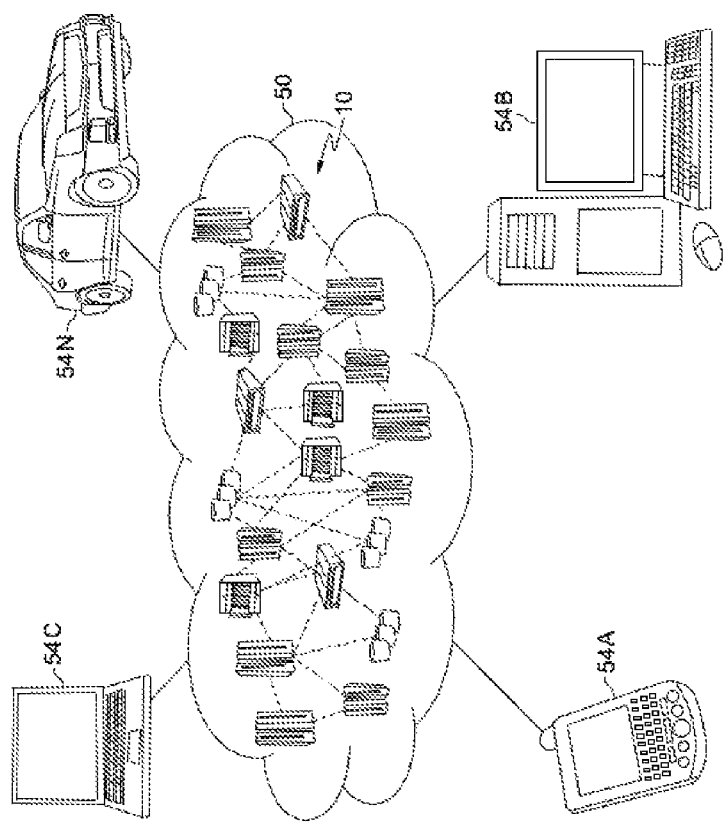
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
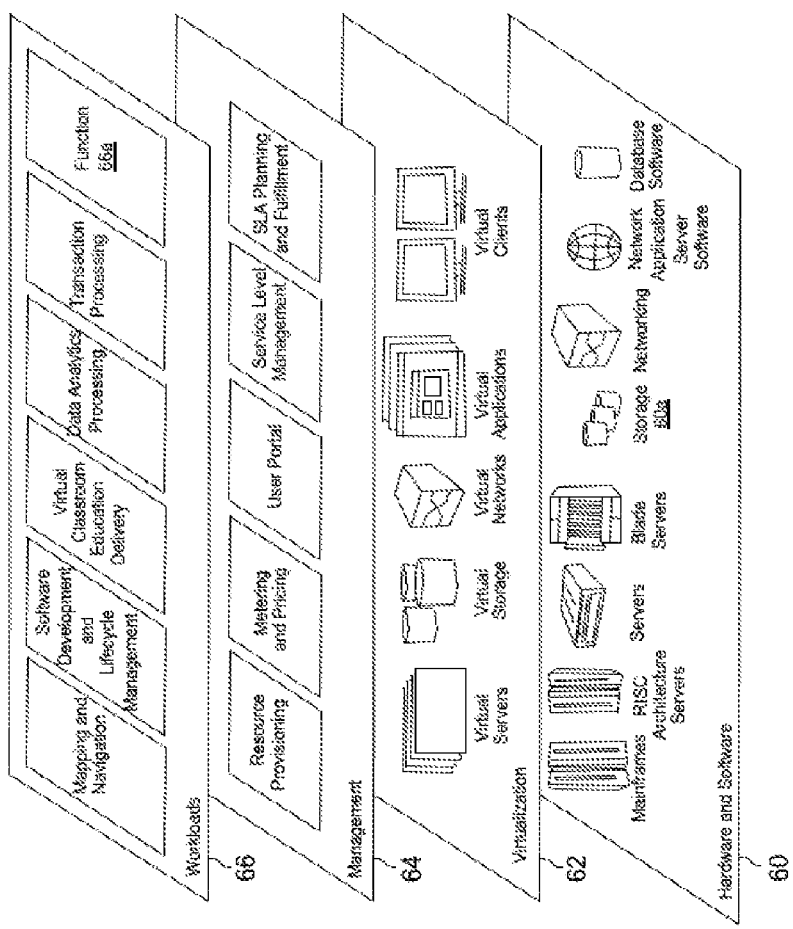
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes; RISC (Reduced Instruction Set Computer) architecture based servers; storage devices; networks and networking components. In some embodiments software components include network application server software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and functionality according to the present invention (see function block 66a) as will be discussed in detail, below, in the following sub-sections of this Detailed description section.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 4:
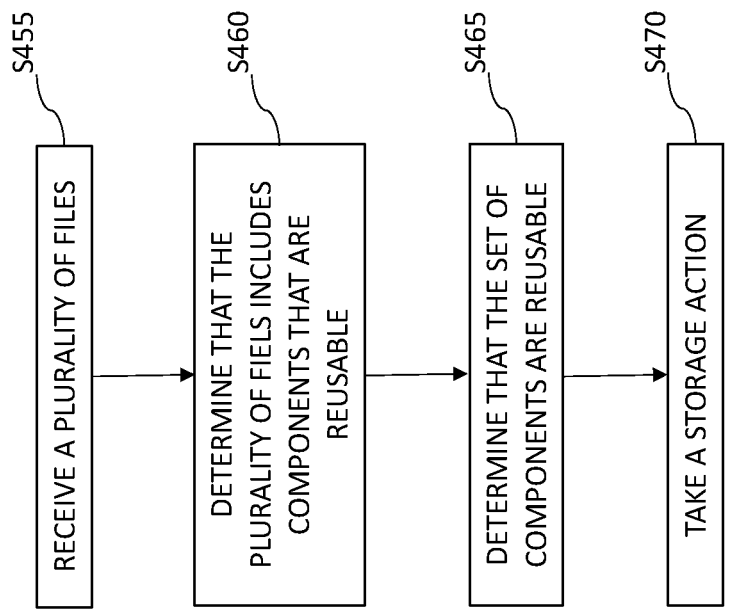
FIG. 4 is a flowchart showing a first embodiment method performed, at least in part, by the first embodiment system.
Figure 5:
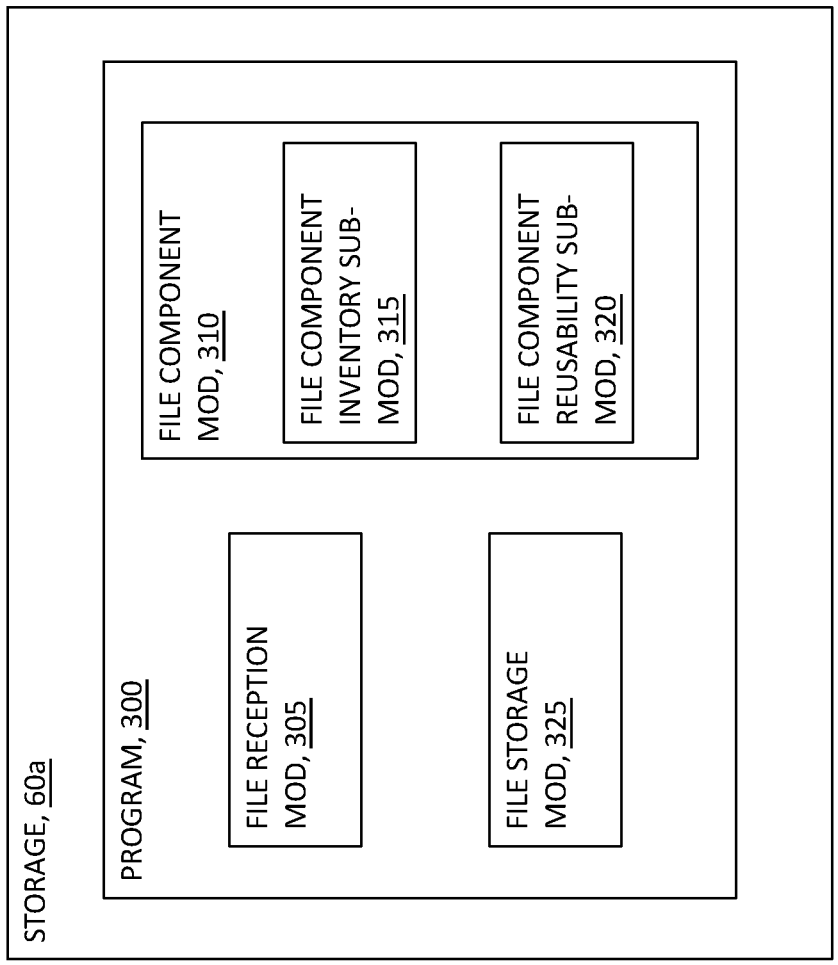
FIG. 5 is a block diagram showing a machine logic (for example, software) portion of the first embodiment system.

FIG. 4 shows flowchart 450 depicting a method according to the present invention. FIG. 5 shows program 300 for performing at least some of the method operations of flowchart 450. This method and associated software will now be discussed, over the course of the following paragraphs, with extensive reference to FIG. 4 (for the method operation blocks) and FIG. 5 (for the software blocks). One physical location where program 300 of FIG. 5 may be stored is in storage block 60a (see FIG. 3).

Processing begins at operation S455, where file reception module ("mod") 305 receives a first plurality of files from a given file system. In some embodiments, the first plurality of files includes the following types of files: audio files, video files, and text files. These types of files include a variety of content, including social media, text and/or chat content, and official work product content.

Processing proceeds to operation S460, where file component inventory sub-module ("sub-mod") 315 of file component mod 310 determines that the plurality of files received (discussed in connection with operation S455, above) includes file components that can be potentially considered as reusable. The file components that are identified by file component inventory sub-mod 315 are listed and discussed in greater detail in Sub-Section III, below.

In some embodiments, the potential for a file component to be "reusable" is determined based upon the substantive data and the metadata of a given file. For example, if a file system includes a first document that has is considered as official work product, and a second document that is not considered as official work product, then file component inventory sub-mod 315 will determine that these two documents do not have file components in common. Therefore, both documents will be kept in the file system and not deleted.

Processing proceeds to operation S465, where file component reusability sub-mod 320 of file component mod 310 determines that the file components identified (discussed in connection with operation S460, above) are reusable. In some embodiments of the present invention, file component reusability sub-mod 320 determines whether these file components are reusable by: (i) determining a reusability score for each component that is identified, and (ii) comparing the reusability score for each identified component against a file component reusability threshold.

In some embodiments of the present invention, each identified file component is assigned a value of "yes, no, or maybe." Each of these assigned values corresponds to a numerical value (that can be adjusted by the user). Alternatively, the values assigned to each file component can be a numerical percentage value (such as 50% or 75%) rather than a string (such as "yes, no, maybe").

Consider the following example with respect to a file that is considered official work product:

File component inventory sub-mod 315 has identified these file components and file component reusability sub-mod 320 has determined the following with respect to the file component's reusability: (i) File Content (yes); (ii) File Name (yes); (iii) Directory Structure (yes); (iv) File Metadata (maybe); (v) Organizational Rules (maybe); and (vi) Official Communications (maybe).

In this example, the value "yes" has a corresponding numerical value of two (2), the value "no" has a corresponding numerical value of zero (0), and the value "maybe" has a corresponding numerical value of one (1). If the non-reusability threshold is set to eight (8), and the content of the official work product has a score of nine (9), then sub-mod 320 will determine that the content is not reusable.

Processing finally proceeds to operation S470 where file storage mod 325 takes a storage action. In some embodiments of the present invention, the storage action taken by file storage mod 325 can include the following: (i) saving and/or otherwise storing the file as a separate, replicated file, (ii) moving the file to another storage location, and (iii) deleting the file when the file components are determined to no longer be reusable.

III. Further Comments and/or Embodiments

In the digital era, most people typically consume information in the form of images and documents. With the increased consumption of information, the problem of safely and efficiently storing the information locally (such as on personal device or over cloud) arises.

However, each available storage mechanism has a potentially limited utility because storage has a cost. It is not generally known: (i) what the life of a document file is; (ii) what its content life to cluster out the files and keep only the files for some pre-defined period time; (iii) what reusable contents exist for some files for a given time period. This ultimately requires files to be stored in a manner that is redundant and for a longer period of time until these redundancies are manually corrected. Additionally, these redundancies occupy storage space on personal devices and potentially forces consumers to purchase extra storage (such as cloud storage or physical storage devices).

What is needed is a way to consider reusability aspects of a stored file and plan the storage of these files accordingly.

Embodiments of the present invention provide an Artificial Intelligence (AI) and Internet of Things (IoT) based system and method that predicts the chronological requirements for various components of the file-being-stored, and then take an appropriate storage action on each component based on the predicted chronological requirements.

An Artificial Intelligence (AI) and Internet of Things (IoT) based system and method predicts the chronological requirements for various components of a file that is being stored, and then takes an appropriate storage action on each component of the file based on the predicted chronological requirements. Reusability is predicted using data sources such as: file contents, file name and directory structure, calendar, social media, organizational and general rules, and communications.

Additional file components used to consider reusability include: file sections, templates used for the file and its contents, and the substantive information contained within the file itself. In some embodiments of the present invention, the predicted chronological requirements are mappings of considered file components to time frames, and are defined on the basis of data type, time, time period, and event. In some embodiments, the storage action taken on each considered file component includes generation of audit information along with an action such as: (i) saving/storing it as a separate file, (ii) moving it to another storage location, and (iii) deleting it when it is no longer reusable. Additionally, the components of the file being stored includes text, image(s), audio, and/or video.

In some embodiments, even if one data source does not have information, other data sources may have information. For a file content, data sources used also can be configured. For example, for an official file, information found in social media will not be referred to. Therefore, different categories of information will be mapped to a set of data sources.

For example, an "official" file component will have the following data sources: file contents, file name, directory structure, file metadata, organization rules, and official communications. Additionally, a "personal" file component will have the following data sources: file contents, file name, directory structure, file metadata, general rules, social media, and personal communications.

Moreover, the overall information (from all data sources) is used to determine where the file component is exceeding a threshold and/or confidence-factor for not being usable. This threshold can be configured, or determined by using machine learning techniques. In some embodiments, the file component is deleted only when the file component has been determined to exceed this threshold.

Additionally, some embodiments of the present invention provide a substantial cost saving for end users as well as for the organizations offering default storage to organization resources and/or employees.

Consider the Following Example where a Section is a File Component:

Person A has joined a start-up company. She is in a support team for their recently launched enterprise service on the cloud where she leads the support team. The support team uses an external cloud storage service for document sharing. After some time, a severity-1 issue was reported to the support team. The team analysed the issue within 6 hours of reporting, and fixed within 4 hours after the analysis. Everyone is happy to meet their 24-hour Service Level Agreement (SLA) for severity 1 issue. As the protocol as well as a best practice, Person A creates an analysis report for future references. These analysis reports are kept for three (3) years and archived and/or deleted after three (3) years from the date of creation.

This five (5) Megabyte (MB) report has the following sections: Observation (reported by the client), Logs (shared by the client), Expectation (by the client), Analysis (by support), Fix Implemented, and Recommendation. Person A, collaborating with the support team, creates the analysis report and uploads it on the external cloud storage.

Without the implementation of idea, the report keeps consuming five (5) MB report for three (3) years. However, with the implementation of the idea: (i) as soon as the file is uploaded on Google drive, system determines that Logs section is consuming 4.5 MB out of 5 MB; (ii) System determines that this is analysis report for future references, so Logs section may not be required for 3 years, it is good to keep Logs until the client gets the fix; (iii) System sets the deletion date for Logs section as the event of next fix pack (hot fix) release; (iv) as soon as the next fix pack is released, system checks the release notes and finds the defect as fixed in the fix pack; (v) system replaces the Logs section from the document with a note/comment reporting that Logs section has been removed from the document as it was large and is not expected to be referred in future; and (vi) Person A's company saves storage cost as the file is now saved as a file of size around 0.5 MB.

Consider the Following Example where the Template is a File Component:

Person B works for a company and is in the product sales department. He uses presentation software (PS) while working with clients on various deals, and stores these presentations over an external cloud storage. Person B's product portfolio has recently got stronger by the addition of proprietary software products, and he develops a presentation file for the upcoming sales meeting for these proprietary software products, where a sale is ultimately made.

Person B gets another opportunity to sell these proprietary software products. Without implementing embodiments of the present invention: (i) while working on the material for the second deal, Person B realizes that he could reuse the PPT template (both background and sections) he used for the first deal; (ii) he saves the existing PPT as a new one; and (iii) he then edits the new PPT for inserting the information specific to the new deal.

With the implementation of embodiments of the present invention: (i) when Person B uploads the PS (for the first deal) over the external cloud storage, system determines that it is a template driven document (where template consists of Background Slide, Colour Scheme, Header, Footer, Table of Contents, etc.); (ii) based on Person B's role at his company, the system determines that Person B may use such PPTs in future; (iii) the system extracts the template and save it to another location (say, the parent directory of the directory where Person B uploaded the PPT); (iv) the system informs person B that a sales template was observed in the PPT he recently uploaded, and the extracted template is available for his reuse (system includes the location in the notification); and (v) the system shares the template with sales and/or Person B's team so that anyone among them can reuse the template.

Consider the Following Example where Information is a File Component:

Person C has an external cloud storage account (CSA). He has set up a daily sync-up of media from his mobile phone to the CSA. Person C consumes a considerable amount of media content through social media. At one point in time, Person A is receiving messages that occupy five (5) GB of storage.

Without implementing embodiments of the present invention, Person C loses 5 GB space from his personal device and cloud storage, and this 5 GB content (consisting of irrelevant images in the context of time) stays in his personal device and cloud storage until it is manually removed.

With the implementation of embodiments of the present invention: (i) Person C receives a message and/or other media content; (ii) the system determines that it is a forwarded new year wish message/media; (iii) the system further determines the end of life of the message/media as 15-Jan; (iv) the system removes it from both mobile phone and cloud storage around 00:00 on 16-Jan. System frees almost 4.5 GB space due to such generic/forwarded messages; (v) Person C receives another personalized image; (vi) the system determines that it is a personal message and the image should be kept; (vii) the system does not set any end of life for the image; (viii) after a specified number of days, the system cleans up the files that has completed their life and removes them permanently; and (ix) Person C saves 9 GB (4.5 GB+4.5 GB) of data storage space and its corresponding costs.

In some embodiments, the user can be an individual or an organization. A user to sign up for this service because embodiments of the present invention may access user data such as social media which can be considered as sensitive by the users.

Embodiments of the present invention include a background service at the storage service, or an independent service. In one embodiment, the proposed service can also have a client-side component, such as a browser plugin to collect play time information for media files such as audio and video files. Whenever the system detects a new file, the system is triggered.

In some embodiments, the system processes the file to list the file components. In some embodiments, the system uses Natural Language Processing (NLP) for text contents. For visual contents, the system uses image processing techniques to understand and analyze these visuals. In some embodiments, deep learning techniques such as R-CNN are used. If the image being analyzed has text, then NLP is used as a subsequent step in the analysis.

For audio contents, speech-to-text conversion is used and then NLP is used as the subsequent step to analyze the text contents of the audio file(s). In some embodiments, the file component can be a: (i) file section (including a section of a word file or a start of a topic in a presentation); (ii) template (including a table of contents, message/documentation style, topic followed by a brief explanation/example/conclusion); and/or (iii) information (including facts, general approach, and a process description).

In some embodiments, the system generates identifiers for each detected file component and creates a map with keys as the identifiers of each component detected during processing. Additionally, the system determines the reusability requirements for each detected file component by mining various data sources. In some embodiments, these data sources include: (i) contents of the file; (ii) file name; (iii) directory structure (for example, a file in the "2021-2022 Financial Data" folder is most likely to have financial information related to the 2021-2022 fiscal year); (iv) calendar (for example, an invention mentoring session scheduled after a month indicates that the invention mentoring related information will be required at least for a month); (v) social media (for example, a social media post indicates that a user would like to keep all 2021 New Year wishes); (vi) organizational rules (for example, keep risks in project status report for the last three (3) months whereas activity reports should be kept for six (6) months); (vii) general rules (for example, keep office electricity bill payment references for last one (1) year); and (viii) communications (for example, a user sends a chat message to a colleague).

For determining reusability requirements (as required), some embodiments of the present invention uses NLP and speech-to-text conversion techniques. In some embodiments, based on the determined reusability requirement, the system updates the map to have a value for each key (belonging to a file component). The value can be an: absolute date, absolute time (such as a timestamp), a time period (such as seven days from the current moment), and/or an event (such as when an employee joins a given department).

In some embodiments, the system processes such maps periodically using a configured period (for example, a recurring one day period). As part of processing a map, if the current time is beyond the value of a map entry, the system will take an appropriate action, including: (i) delete (for example, remove a section); (ii) restore/save (for example, update a section by keeping only the required information); and/or (iii) move (for example, a policy is to move the no-longer-required contents to a low-cost storage for some time).

While taking an action, system generates audit information indicating information such as what was removed, why it was removed, and when it was removed. In some embodiments, the system uses NLP based text synthesis techniques to form the audit information as a comment. The system saves the audit information within the file. In some embodiments, sections that are removed (or no longer required) can be replaced with a comment or note. Additionally, a template can be saved as a new file with a comment included at the top of the substantive content of the file.

Some embodiments of the present invention may include one, or more, of the following features, characteristics and/or advantages: (i) predicts the chronological requirements for various components of the file-being-stored and accordingly takes an appropriate storage action on each component; (ii) extracts the reusable components of a file and stores these extracted components based on the reusability potential that is predicted for these extracted components; and (iii) determines the life of the file components and removes and/or relocates the components based on the determined life of the file components instead of simply removing duplicate files.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above-similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) comprising:
    identifying, by a storage service, a plurality of files being stored from a file system;
    responsive to the files being stored, identifying a set of file components in a first file of the plurality of files;
    determining, by an artificial intelligence (AI) module, that a first sub-set of file components are potentially reusable based on predicted chronological requirements for each subset of file components;
    determining, by a machine learning module, that a first file component is reusable based, at least in part, upon the first file component having a component reusability score above a component reusability threshold; and
    responsive to the determination that the first file component is reusable, taking a storage action on the first file such that the first file component is available for reuse.

2. The CIM of claim 1 wherein taking a storage action on the first sub-set of files further includes:

storing the first sub-set of files in the file system;
subsequent to the storing of the first sub-set of files in the file system, determining that the set of components have a reusability score below the component reusability threshold; and
deleting the first sub-set of files in the file system.

3. The CIM of claim 1 wherein taking a storage action on the first sub-set of files includes moving the first sub-set of files from the file system to a target location.

4. The CIM of claim 1 wherein taking a storage action on the first sub-set of files includes saving the first sub-set of files as a set of replicated files.

5. The CIM of claim 1 wherein the component reusability threshold is set based upon results of machine learning tests.

6. The CIM of claim 1 wherein the component reusability threshold is determined by a user.

7. A computer program product (CPP) comprising:
a machine readable storage device; and
computer code stored on the machine readable storage device, with the computer code including instructions and data for causing a processor(s) set to perform operations including the following:
identifying, by a storage service, a plurality of files being stored from a file system;
responsive to the files being stored, identifying a set of file components in a first file of the plurality of files;
determining, by an artificial intelligence (AI) module, that a first sub-set of file components are potentially reusable based on predicted chronological requirements for each subset of file components;
determining, by a machine learning module, that a first file component is reusable based, at least in part, upon the first file component having a component reusability score above a component reusability threshold; and
responsive to the determination that the first file component is reusable, taking a storage action on the first file such that the first file component is available for reuse.

8. The CPP of claim 7 wherein taking a storage action on the first sub-set of files further includes:
storing the first sub-set of files in the file system;
subsequent to the storing of the first sub-set of files in the file system, determining that the set of components have a reusability score below the component reusability threshold; and
deleting the first sub-set of files in the file system.

9. The CPP of claim 7 wherein taking a storage action on the first sub-set of files includes moving the first sub-set of files from the file system to a target location.

10. The CPP of claim 7 wherein taking a storage action on the first sub-set of files includes saving the first sub-set of files as a set of replicated files.

11. The CPP of claim 7 wherein the component reusability threshold is set based upon results of machine learning tests.

12. The CPP of claim 7 wherein the component reusability threshold is determined by a user.

13. A computer system (CS) comprising:
a processor(s) set;
a machine readable storage device; and
computer code stored on the machine readable storage device, with the computer code including instructions and data for causing the processor(s) set to perform operations including the following:
identifying, by a storage service, a plurality of files being stored from a file system;
responsive to the files being stored, identifying a set of file components in a first file of the plurality of files;
determining, by an artificial intelligence (AI) module, that a first sub-set of file components are potentially reusable based on predicted chronological requirements for each subset of file components;
determining, by a machine learning module, that a first file component is reusable based, at least in part, upon the first file component having a component reusability score above a component reusability threshold; and
responsive to the determination that the first file component is reusable, taking a storage action on the first file such that the first file component is available for reuse.

14. The CS of claim 13 wherein taking a storage action on the first sub-set of files further includes:
storing the first sub-set of files in the file system;
subsequent to the storing of the first sub-set of files in the file system, determining that the set of components have a reusability score below the component reusability threshold; and
deleting the first sub-set of files in the file system.

15. The CS of claim 13 wherein taking a storage action on the first sub-set of files includes moving the first sub-set of files from the file system to a target location.

16. The CS of claim 13 wherein taking a storage action on the first sub-set of files includes saving the first sub-set of files as a set of replicated files.

17. The CS of claim 13 wherein the component reusability threshold is set based upon results of machine learning tests.

18. The CS of claim 13 wherein the component reusability threshold is determined by a user.

* * * * *